March 26, 1940.  F. E. MOORE  2,195,371
FRUIT AND VEGETABLE WASHING AND DRYING APPARATUS
Filed April 30, 1937  2 Sheets-Sheet 1
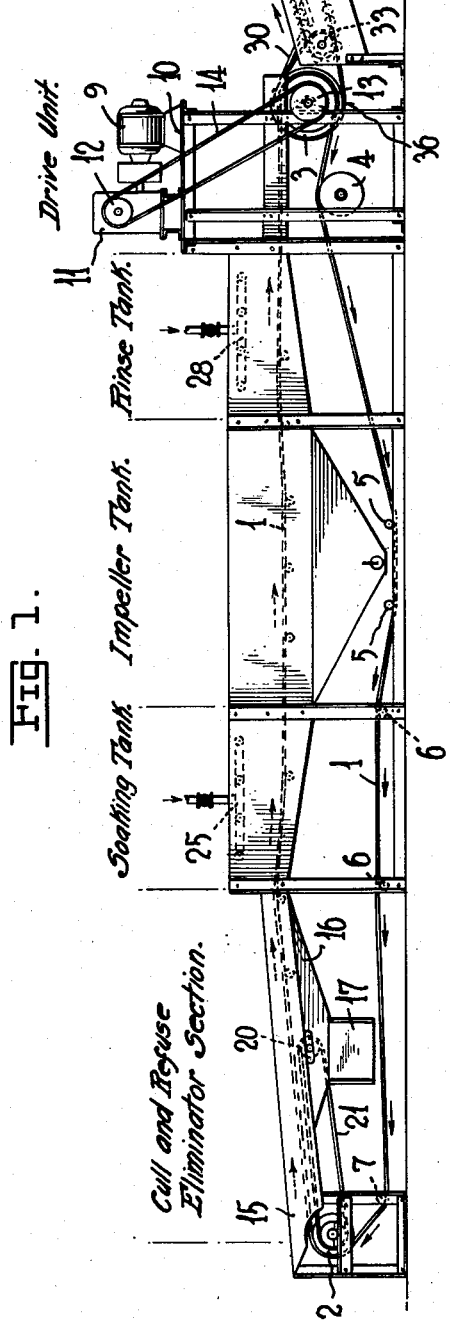

March 26, 1940.  F. E. MOORE  2,195,371
FRUIT AND VEGETABLE WASHING AND DRYING APPARATUS
Filed April 30, 1937  2 Sheets-Sheet 2
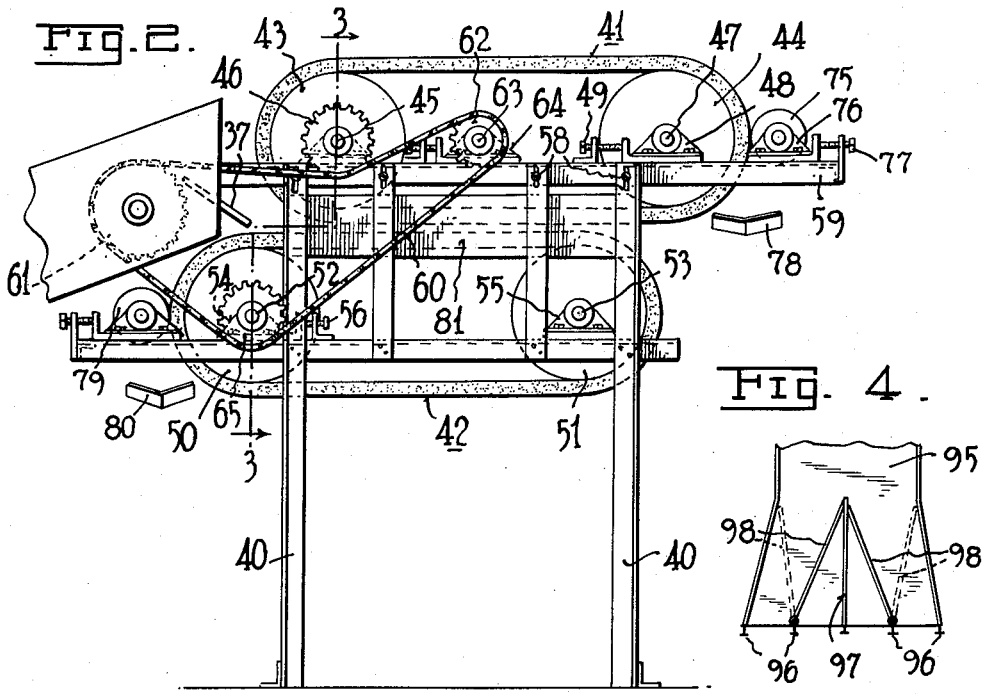
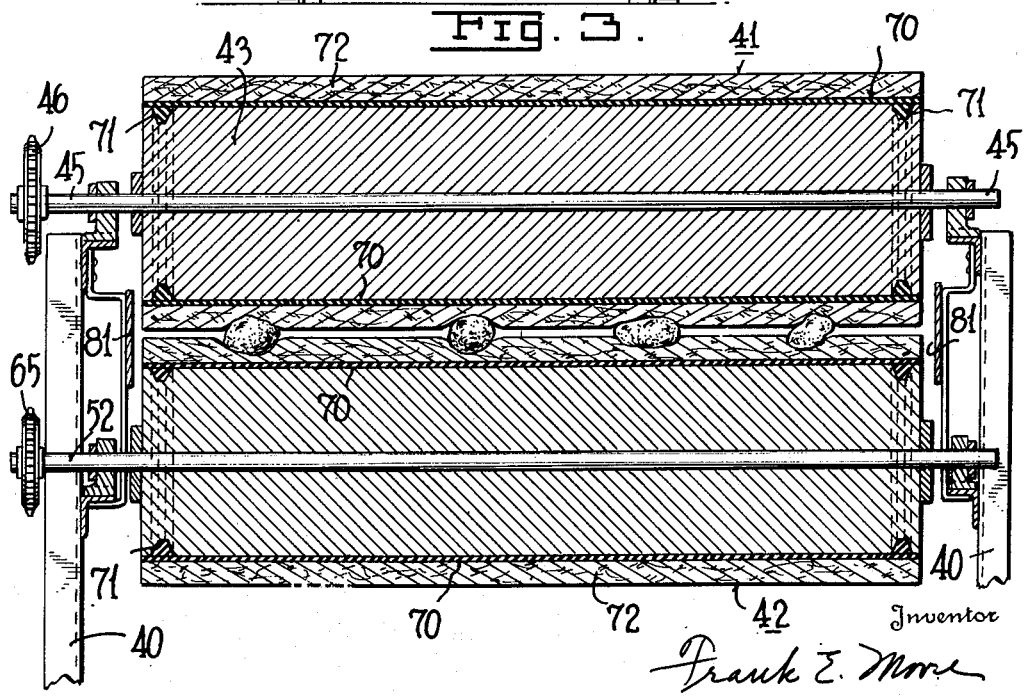
Inventor
Frank E. Moore
By Paul, Paul & Moore
Attorneys Patented Mar. 26, 1940

2,195,371

UNITED STATES PATENT OFFICE 2,195,371

FRUIT AND VEGETABLE WASHING AND DRYING APPARATUS

Frank E. Moore, Ellwood City, Pa., assignor to Mathews Conveyer Company, Ellwood City, Pa., a corporation of Pennsylvania Application April 30, 1937, Serial No. 140,029

4 Claims. (Cl. 34—1)

This invention relates to washing and drying apparatus and has particular reference to an apparatus for washing and drying fruit and vegetables and grading the same.

Modern merchandising demands that fruit and vegetables that are offered for sale must be clean and attractive in appearance. It is therefore, common practice to wash these articles at the time they are prepared for shipment. Potatoes, for example, are delivered by the grower as they are dug from the ground and therefore have considerable soil clinging to them. The shipper places these potatoes in a suitable apparatus where they are first washed and then dried and either sacked and shipped, or first graded for size and defects and then sacked and shipped.

In the present commercial form of washing and drying apparatus, considerable difficulty has been experienced in thoroughly drying the articles after the washing process and various forms and types of drying methods have been used. Some of these drying arrangements involve the use of air blasts to blow off surplus water. In the case of potatoes, it has been found that an air blast will blow some of the surplus water therefrom, but it also spreads the water evenly over the surface of the potatoes and thus does not remove a sufficient amount of moisture to constitute successful drying. Other drying arrangements involve the use of circulating conditioned air to evaporate the water and moisture from the articles but such methods are expensive and require considerable apparatus. Still other arrangements involve the use of some water absorbing medium which contacts the articles and absorbs the water and moisture therefrom. It is to this latter class of devices that the present invention is directed.

The apparatus for washing and drying the articles must operate continuously and have a capacity, in some cases, of washing and drying from 5 to 8 carloads of potatoes or other articles a day. It is thus obvious that during the drying operation a large volume of liquid must be removed from the surfaces of the articles so that they will emerge from the apparatus in a substantially dry condition and may be placed immediately in cold storage or refrigerated cars for shipment.

It is the primary object of the present invention to provide an improved form of washing, drying and grading apparatus which may be operated continuously to completely wash all foreign substances from the articles, effectively dry them without delay to a degree of dryness permitting immediate packing or sacking, and grade the same for size and defects before they are packed for shipment.

Another object is to provide a novel and improved form of drying device for an apparatus of this character which shall be capable of operating continuously to completely absorb substantially all surface moisture from the articles as they pass therethrough so that the articles will emerge continuously from the apparatus in a substantially dry condition suitable for immediate packing for shipping or placing in cold storage.

Another object is to provide a novel form of drying device of the absorption type wherein the articles pass continuously therethrough, and during such passage, they are continuously rotated to present all surfaces to the absorbing medium.

A further object is to provide a drying device of the aforesaid character that is preferably in the form of two continuous belts between which the articles pass. These belts being formed of a novel and greatly improved resilient absorbing medium that is capable of absorbing a much larger volume of liquid than heretofore possible with natural sponge or sponge rubber, and then quickly and substantially completely releasing the absorbed liquid so that the articles passing between the belts have substantially all surface moisture completely removed and the articles emerge continuously from the drier in a substantially dry condition ready for immediate shipment or placing in a cold storage.

A still further object is to provide a drier of the aforesaid character which is relatively small and compact and hence occupies a minimum space, and which is readily accessible for adjustments during operation thereof.

With the foregoing and other objects and advantages in view, the invention may be stated to consist in the various novel features of construction and arrangement or combination, all of which will be fully described hereinafter and pointed out in the appended claims.

In the drawings accompanying and forming a part of this application,

Figures 1 and 1A are respectively side elevations of a washing, drying and grading apparatus constructed in accordance with my invention;

Figure 2 is a side elevation of the drying device;

Figure 3 is a vertical sectional view taken on the line 3—3 of Figure 2; and

Figure 4 is a fragmentary plan view of the discharge end of the discharge chute.

In the drawings, I have illustrated my apparatus as particularly designed for washing, drying and grading potatoes, although it will be understood that the apparatus may be used for other vegetables and fruits, and in fact is susceptible to use for washing and drying various articles.

Referring to Figures 1 and 1A, my improved apparatus comprises in the order named, a cull and refuse eliminator section, a soaking tank, an impeller washing tank, a rinse tank, drive unit, inclined rolling roll picker unit, dryer unit and an inclined sizing unit. The various sections and units are interconnected so that articles to be washed are dumped into the cull and refuse eliminator section and then progress continually through the apparatus and emerge on the discharge chute in a clean dry condition ready for packing and shipping.

The cull and refuse eliminator section, soaking tank, impeller tank, rinse tank and drive unit have a common conveyer belt 1 for the articles. This belt is preferably an open mesh type conveyer belt having mesh openings of a size to permit culls to drop therethrough. As shown in Figure 1, this belt passes over a roller 2 at the receive end of the cull and refuse eliminator section, then extends upwardly on a slight incline through this section, then downwardly into the soaking tank, impeller tank and rinse tank, thence around a roller 3 on the drive section. The belt returns beneath the apparatus, passing over idler roller 4, beneath idler rollers 5 under the impeller tank, over idler rollers 6 beneath the soaking tank, and beneath idler roller 7 to the afore-mentioned roller 2. This belt is driven by any suitable source of power, as for example, an electric motor 9 which is mounted on a suitable platform 10 above the apparatus. The motor 9 is preferably connected to a variable speed power transmission device 11 which is provided with a drive sprocket 12. A sprocket 13 is fitted to the outer end of the shaft on roller 3 and a chain 14 interconnects these sprockets.

Referring now to the cull and refuse eliminator section, it will be noted that I provide a hopper 15 above the conveyer belt 1 to receive the potatoes or other articles dumped onto the conveyer belt. I also provide a hopper 16 beneath the conveyer belt for catching the small potatoes or culls that drop through the conveyer belt, as well as loose dirt and other foreign substances, and this hopper is preferably provided with a discharge spout 17 that projects to one side of the section. In order to facilitate the separation of the culls and foreign substances from the potatoes, I preferably arrange an eccentrically journalled roller 20 beneath the conveyer belt 1 which is adapted to vibrate the belt vertically. This roller is driven by a chain 21 operatively connected to roller 2.

As the potatoes that are retained on the belt 1 move from the cull and refuse eliminator section, they enter the soaking tank and pass progressively through the impeller tank and rinse tank. These three tanks are combined as a single tank and this entire section of the apparatus is similar in principle to the washing apparatus disclosed in William L. Dean and Frank S. Lampard Patent No. 2,050,964 issued August 11, 1936, to Mathews Conveyer Company. The potatoes are sprayed with water by suitable spray apparatus 25 as they enter the soaking tank, which serves to wet the potatoes and loosen and remove some of the dirt still clinging to them. As they pass through the impeller tank, all dirt and foreign substances are completely removed by the walls of churning and surging water that completely envelops the potatoes on the conveyer belt. Passing from the impeller section, the potatoes are again sprayed with clean water from a spray device 28 and emerge in a clean but wet condition.

The clean wet potatoes are discharged from conveyer belt 1 onto a chute 30 which directs them onto the inclined rolling roll picker unit. This unit comprises a pair of transversely spaced chain loops 31 having wooden rollers 32 interposed therebetween. The chain loops are engaged about suitable sprockets 33 that are mounted on transversely disposed shafts at each end of this unit. A pair of wooden rails or runners 34 are arranged beneath the upper run of the rolling roll conveyor, one runner adjacent each end of the rollers 32, so that as the conveyer moves upwardly, the rollers 32 will each revolve, thereby continually turning the potatoes. Operators stand at each side of this unit and pick out defective potatoes and culls that have not been eliminated by the mesh conveyer belt 1. This unit may be driven by a chain 36 interconnected between suitable sprockets on roll 3 and the shaft at the lower end of the rolling roll picker unit.

As shown in Figure 1A, the potatoes from the rolling roll picker unit are discharged into a slide or chute 37 which directs them into the dryer unit.

The dryer unit, as shown in detail in Figures 2 and 3 comprises a suitable framework 40 made from angle iron or other suitable material. Supported on this framework are two horizontally disposed endless dryer belts indicated at 41 and 42. The upper belt 41 rotates about horizontally spaced rollers 43 and 44. Roller 43 is carried by a shaft 45 that is journalled in bearing blocks fastened to the framework, and this shaft is fitted with a drive pinion 46 to be referred to more particularly hereinafter. Roller 44 is mounted on a shaft 47 that is journalled in bearing blocks 48 which are slidably mounted on the framework. Suitable thrust screws 49 serve to displace the bearing blocks 48 to adjust the tension of belt 41.

The lower belt 42 rotates about rollers 50 and 51 which are mounted respectively on shafts 52 and 53 that are journalled in bearing blocks 54 and 55 respectively. Bearing blocks 55 are rigidly fastened to the framework 40 and bearing blocks 54 are preferably slidably mounted thereon and adjusted horizontally by set screws 56 to vary the tension of lower belt 42.

It will be noted that the upper belt 41 is adjustable as a unit vertically with respect to the lower belt 42 thereby to vary the distance between these belts depending upon the size and nature of the articles to be dried. This is accomplished by slotting the vertical members of the framework as indicated at 58 and bolting the upper horizontal members 59 to the vertical members through said slots.

In the present instance, I have shown the dryer as being driven from the drive unit of the previously described apparatus, although it is obvious that the drier may be driven by a separate motor or other prime mover if desired. Referring to Figure 1A it will be seen that power is taken from the shaft of roller 33 by means of a chain 60 which passes around a sprocket 61 on said shaft, then beneath sprocket 46 of the upper belt, then around a sprocket 62 that is mounted on a shaft 63 which is journalled in bearing blocks 64 that are slidably and adjustably mounted on the framework members 59. From sprocket 62, chain 60 passes beneath a sprocket 65 which is mounted on shaft 52 of the lower belt 42, then around the aforementioned sprocket 61.

I preferably drive the upper belt 41 and the lower belt 42 at different speeds so that articles passing between these belts will be given a rolling motion to expose all surfaces thereof to the belts. I accomplish this by providing a different number of teeth on sprockets 46 and 65. In actual practice, sprocket 46 is provided with 10 teeth and sprocket 65 with 14 teeth thereby causing the upper belt 41 to move faster than lower belt 42, although it will be understood that any other combination of teeth on sprockets 46 and 65 may be used, and if desired, the lower belt could be made to move faster than the upper belt.

Each of the belts 41 and 42 is identical in construction and comprises a base member 70 formed of any suitable tough and resilient material such as 3 ply 28 oz. rubber filled belting. These belts are relatively wide and short and in order to assure accurate longitudinal travel without excessive side weaving, I preferably fasten a V-belt 71 along each longitudinal edge on the inner side of the base member 70 and these belts travel in complementary shaped grooves formed in each of the rollers over which the dryer belts travel. Secured to the base member 70 is the absorbent material 72 which is preferably a synthetic sponge material known as cellulose sponge and manufactured by duPont Company of Wilmington, Delaware. This material is capable of absorbing twenty three times its own weight of water and is three times as absorbent as natural sponge. It also has the characteristic of giving up water very quickly and completely when compressed. This cellulose sponge material may be fastened to the base member 70 in any suitable manner, as by cementing, or stitching, or a combination thereof, or in any other suitable or approved manner. Also the cellulose sponge material may be a continuous piece, or in sections as desired.

While I have disclosed and prefer to use cellulose sponge as the absorbing medium for each of the belts 41 and 42, economic reasons may require in some cases, that only one of the belts be equipped with this particular material and the other belt may be provided with any other suitable absorbing medium, as for example, velour, towelling, or any other approved material. In some instances, the aforementioned cellulose sponge may be omitted entirely and both belts may be fitted with other absorbing materials.

A pressure roll 75 is journalled in bearing blocks 76 which are slidably mounted on the framework and adjustable by a set screw 77. This pressure roll engages the upper belt 41 and squeezes the absorbed water therefrom, such water being caught by a trough 78 therebeneath and conducted away in any suitable manner. A similar pressure roll 79 engages the lower belt 42 and a trough 80 carries off the water removed from this belt.

A guard 81 is arranged at each side of the dryer belts and extends longitudinally along the opening defined by the lower run of the upper belt and the upper run of the lower belt. This guard prevents articles from being discharged at the sides of the dryer due to the aforementioned rolling action of the articles passing therethrough.

It has been found from actual tests, that potatoes passing through this apparatus are substantially completely dried and may be packed for cold storage or shipment without further drying. In similar tests using sponge rubber, the potatoes emerged in a damp or wet condition. In fact, after use, dry potatoes were run through a dryer fitted with sponge rubber belts and the previously dry potatoes emerged wet which indicated that the sponge rubber could not give up sufficient water to absorb the necessary or required additional water in constant use. I have discovered that a dryer fitted with the aforementioned synthetic cellulose sponge material is not only highly efficient but makes possible the first commercial dryer of this type which is successful in completely drying the potatoes or other articles. By completely drying the articles is meant drying to a degree, such that they may be immediately packed for cold storage or shipment without further drying treatments or operations. In the case of potatoes, there is, of course, a very small thin film of dampness still present on the surfaces thereof, but this film quickly evaporates even from the sacked potatoes and hence no harm is done. Actual tests have shown that within two hours after the sacked potatoes were placed in refrigerated cars, the potatoes were completely dry.

Referring again to Figure 1A, it will be seen that the dried potatoes or other articles are discharged from the dryer onto an inclined sizing unit. This inclined sizing unit consists of an open mesh belt 85 which is rotatably supported on two spaced rollers 86 and 87. This unit is driven by a chain 88 connected to the lower roll of the dryer unit. The open mesh belt 85 is selected according to the size of articles to be separated and so that articles smaller than a predetermined size will drop through the belt into a hopper 84 therebeneath and emerge at the side of the apparatus from discharge chute 89. In order to facilitate sizing, an eccentric roller 90 is journalled beneath the upper run of the belt and this roller is driven by a chain 91 connected to the shaft carrying roller 86. Upon rotation, the roller 90 will impart a vibratory motion to the open mesh belt 85. At the upper end of this unit, the potatoes or other articles are discharged into a downwardly inclined discharge chute 95.

As shown in Figure 4 the lower end of this chute is flared laterally and the lower edge is fitted with a plurality of suitable bag supporting elements 96. A central longitudinally disposed partition 97 divides the delivery end of the chute into two discharge paths, and each of these discharge paths is fitted with a pivotally mounted deflector 98. An operator diverts the potatoes into each of two sacks until filled, then swings the deflector 98 to direct the potatoes into the other two sacks, meanwhile the filled sacks are removed, tied and replaced by empty sacks.

It is thus possible with my improved apparatus to carry on a continuous washing, drying, and sizing of potatoes so that they may be immediately packed for cold storage or shipment by refrigerated cars.

It will be understood, that while I have referred to the various operations in connection with potatoes, the apparatus may be used equally well with other vegetables, fruits, or even with metal articles where it is desired to remove grease or similar substances therefrom. In this latter case, a suitable solvent is used instead of water, and the sizing units omitted if found unnecessary.

What I claim is:

1. A fruit and vegetable dryer of the character set forth comprising two endless conveyer belts having substantially horizontally disposed and parallel runs arranged in spaced relation, each of said belts having a base member adapted to take the driving strain, an absorbing surface formed of cellulose material secured to and co-extensive with each base member, said base members each having a longitudinally disposed and inwardly extending rib engaged in a groove formed in the rollers for said belt for preventing lateral weaving of said belt, and means for driving said belts.

2. A fruit and vegetable drier of the character set forth comprising two endless conveyer belts having substantially horizontally disposed and parallel runs arranged in spaced relation, each of said belts having a base member adapted to take the driving strain, a pair of grooved rollers for each belt, an absorbing material secured to and co-extensive with each base member, said base members each having a longitudinally disposed and inwardly extending rib engaged in the groove in the rollers for said belt for preventing lateral weaving of said belt.

3. A drier according to claim 2, in which means are provided to adjust one of the belts to vary the distance between the spaced runs to accommodate larger or smaller articles to be dried.

4. A drier according to claim 2, in which each roller is provided with a pair of grooves one adjacent each end thereof, and in which each base member is provided with a pair of ribs adjacent the edges thereof which extend into the grooves of the rollers.

FRANK E. MOORE.